(12) United States Patent
Chen

(10) Patent No.: US 6,682,150 B1
(45) Date of Patent: Jan. 27, 2004

(54) SECURING MEMBER FOR A WHEEL COVER

(76) Inventor: Yi-Ping Chen, No. 28, Lane 373, Da Xing St., Tainan (TW)

( * ) Notice: Subject to any disclaimer, the term of this patent is extended or adjusted under 35 U.S.C. 154(b) by 0 days.

(21) Appl. No.: 10/245,684

(22) Filed: Sep. 18, 2002

(51) Int. Cl.$^7$ .............................................. B60B 7/12
(52) U.S. Cl. ................................ 301/37.33; 301/37.101
(58) Field of Search ...................... 301/37.101, 37.102, 301/37.31, 37.32, 37.33, 37.34

(56) References Cited

U.S. PATENT DOCUMENTS

| 4,735,460 | A | * | 4/1988 | Tomida et al. | |
|---|---|---|---|---|---|
| 5,718,484 | A | * | 2/1998 | Sheu | 301/37.33 |
| 5,752,745 | A | * | 5/1998 | Sheu | 301/37.32 |

FOREIGN PATENT DOCUMENTS

DE          3809480       * 10/1989

* cited by examiner

Primary Examiner—Russell D. Stormer
(74) Attorney, Agent, or Firm—Rosenberg, Klein & Lee

(57) ABSTRACT

A securing member is provided for securing a wheel cover to a wheel. The securing member has an upper part, and a lower part. The upper part has hooking portions extending from a lower portion. The lower part has an engaging protrusion sticking sideways from a lower portion. The securing member is pivotally connected to one of spaced connecting plates on the edge of a wheel cover. The connecting plates have engaging holes for the hooking portions and the engaging protrusion to be engaged with. The securing member can be connected to the connecting plate in in-use position with the engaging protrusion being inserted into one engaging hole. The securing member can be moved to not-in-use laid-down position so that wheels covers equipped with securing members of the same kind can occupy less space when stacked up in a pile.

4 Claims, 5 Drawing Sheets

SECURING MEMBER FOR A WHEEL COVER

BACKGROUND OF THE INVENTION

The present invention relates to a securing member for connecting a wheel cover to a wheel, and more particularly a securing member, which is made to have relatively uncomplicated structure, and is made without need of assembling, and which can be pivoted to an not-in-use laid down position so that wheels covers equipped with securing members of the same kind can occupy less space when stacked up in a pile.

Most cars have wheel covers fitted to wheels, which are usually made of iron, such that the wheels can have a more pleasing appearance except for those having aluminum wheels, of which the appearance has been processed to be attractive. Wheel covers have securing members spaced apart on the edges for permitting steel rings to be fitted thereto. The wheel covers can be fitted onto wheels by engaging the steel rings and outer side protrusions of the securing members with the inner side of the wheels.

However, conventional securing members have a disadvantage that they stick out from the inner sides of wheel covers with a significant length to cause the wheel covers to occupy more space when the wheel covers are stacked up in a pile, causing inconvenience in storage or transportation.

To overcome the above disadvantage, referring to FIGS. 6 and 7, a securing member is provided to a wheel cover 30. The securing member includes an upper part 10, and a lower part 20 pivoted to the upper part 10 by means of a pivotal pin 40. The lower part 20 has an engaging portion to engage a connecting portion of the wheel cover 30, while the upper part 10 has a protrusion, and a cavity for connection with a wheel, and a steel ring retention respectively.

Thus, the securing member can be folded to not cause increase of space occupied when wheel covers are stacked up in a pile. However, to make the securing member, the manufacturers have to make two separate parts, and join both together with a pin, therefore the production and assembly costs relatively much labor and time.

SUMMARY OF THE INVENTION

It is a main object of the present invention to provide securing members to wheel covers that can be pivoted to a not-in-use laid down position so that the wheels covers can occupy less space when stacked up in a pile.

It is another object of the present invention to provide a securing member which is made to have relatively uncomplicated structure, and can be made without need of assembling.

The securing member of the present invention has an upper part, and a lower part. The upper part has hooking portions extending from a lower portion to face the lower part. The lower part has an engaging protrusion sticking sideways from a lower portion. The securing member is pivoted to one of spaced connecting plates formed on the edge of a wheel cover. The connecting plates have upper, and lower holes for the hooking portions and the engaging protrusion to be engaged with respectively. The securing member can be moved to not-in-use laid-down position where the engaging protrusion of the lower part is separated from the lower hole of the connecting plate, and where the hooking portions of the upper part are inserted into corresponding upper holes of the connecting plate.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
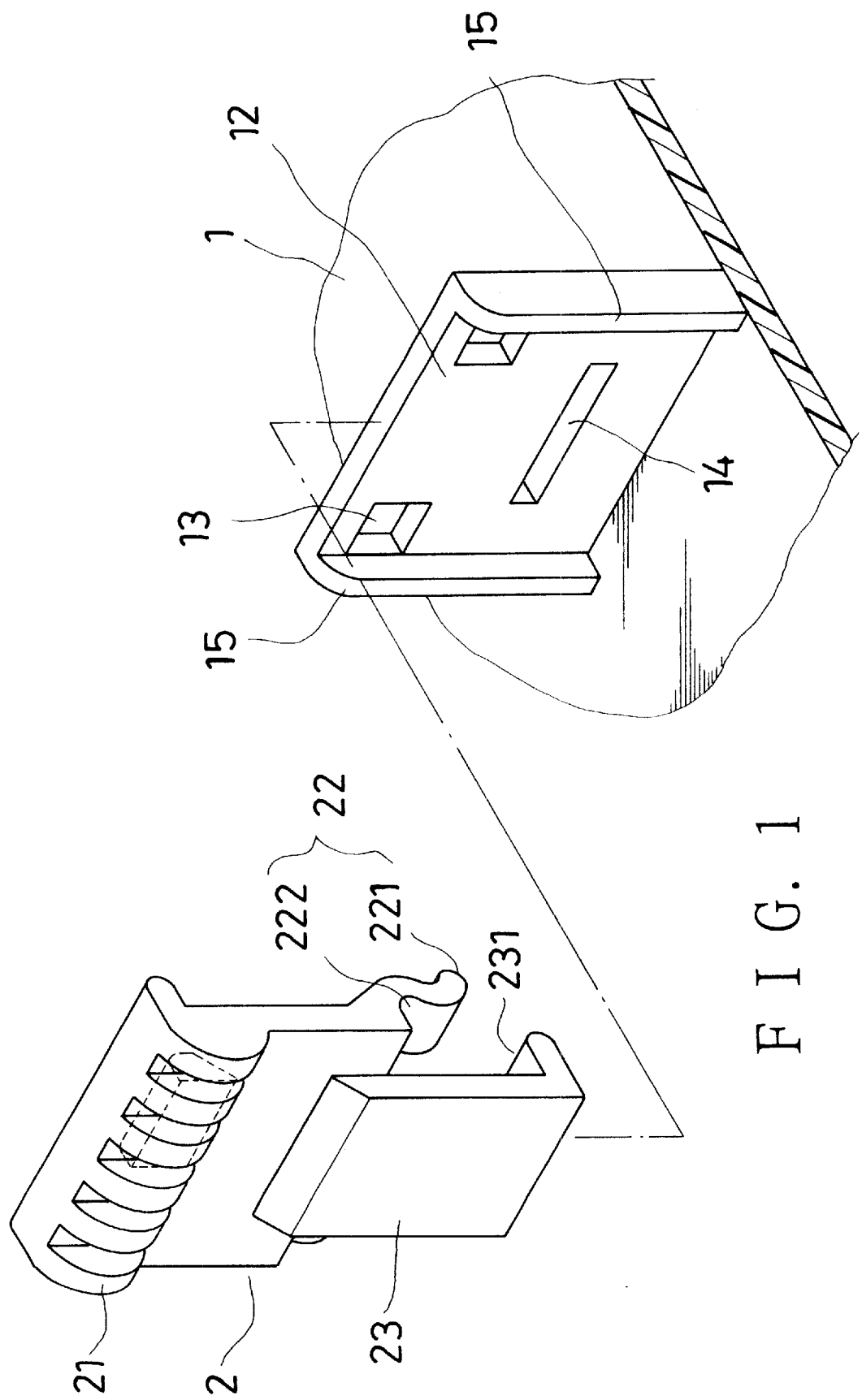
FIG. 1 is an exploded perspective view of the securing member for securing a wheel cover to a wheel according to the present invention.
Figure 4:
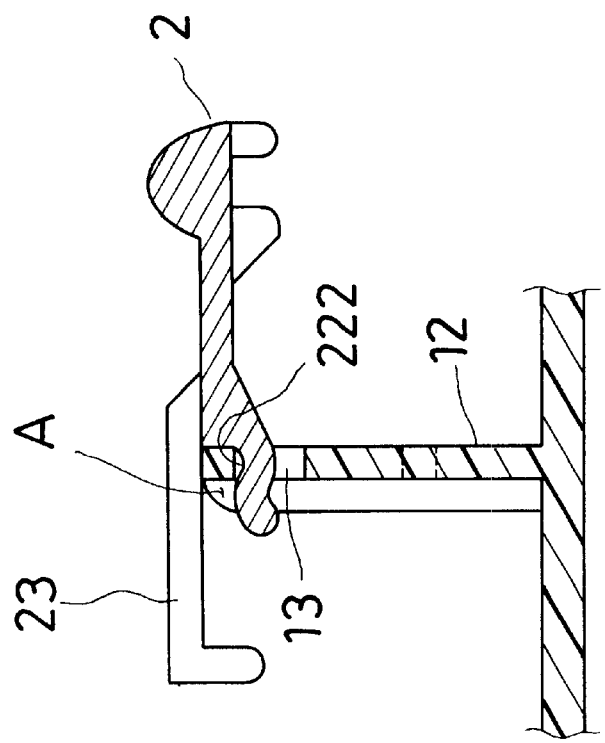
FIG. 4 is a cross-sectional view of the present securing member fitted to a wheel cover and in a laid down position.
Figure 5:
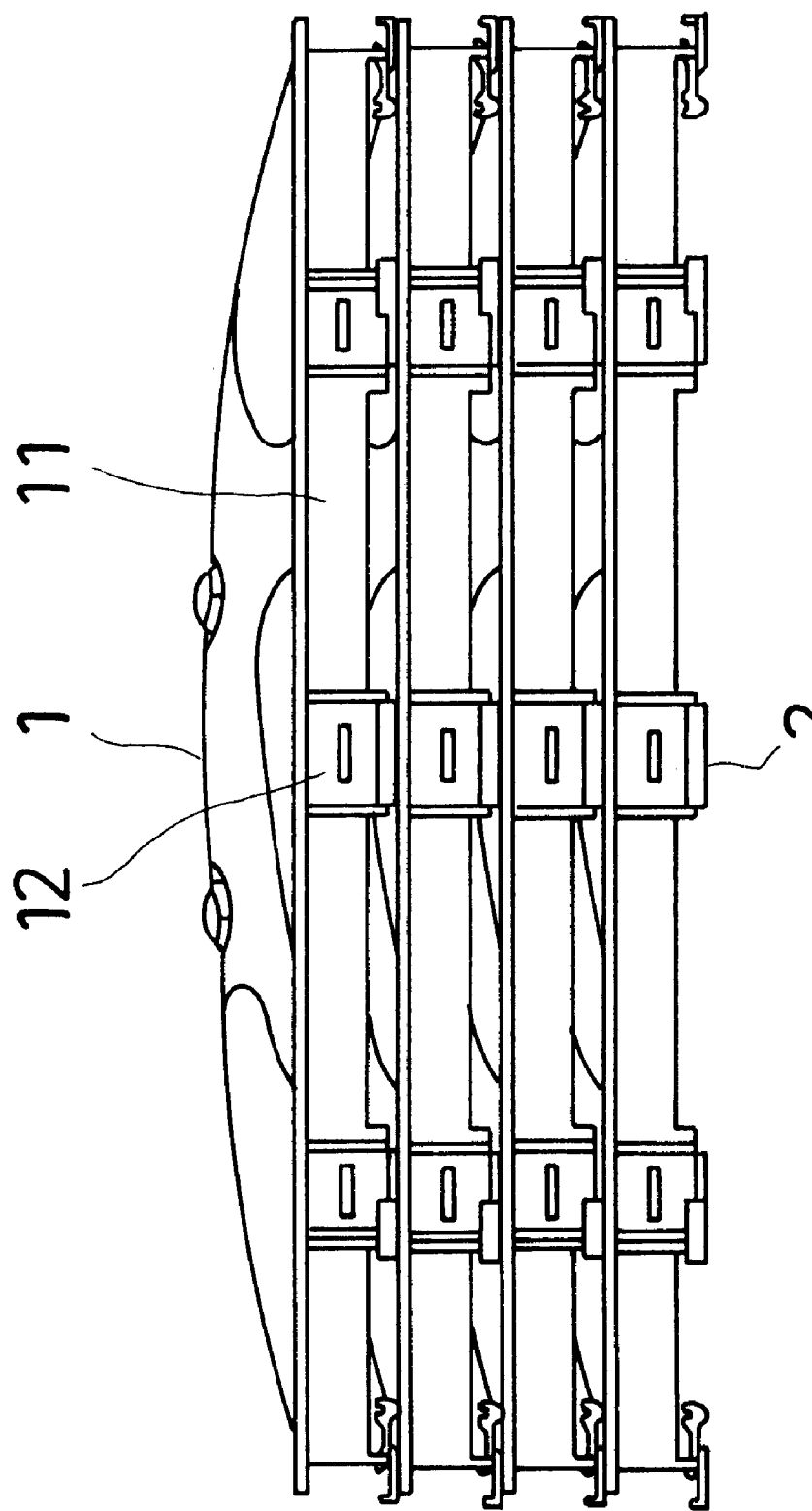
FIG. 5 is a view of stacked up wheel covers with the securing members of the present invention.
Figure 6:
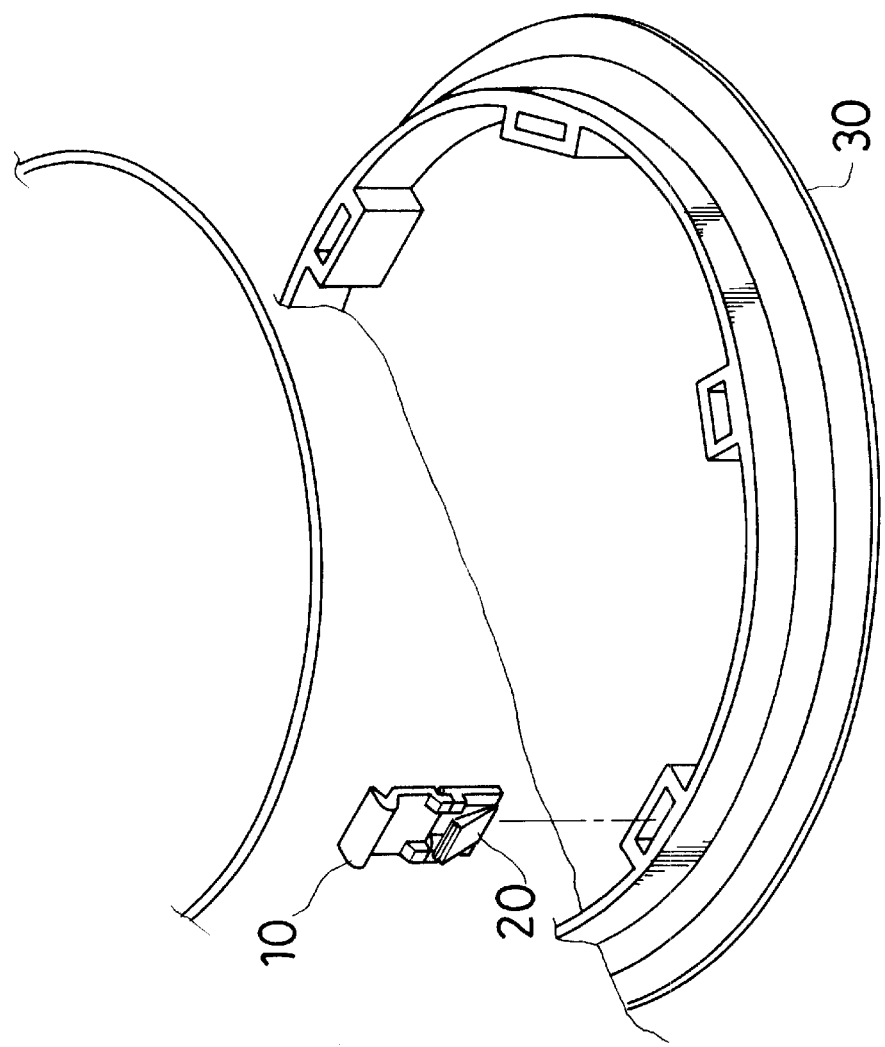
FIG. 6 is an exploded perspective view of a wheel cover with the securing member of the Background.
Figure 7:
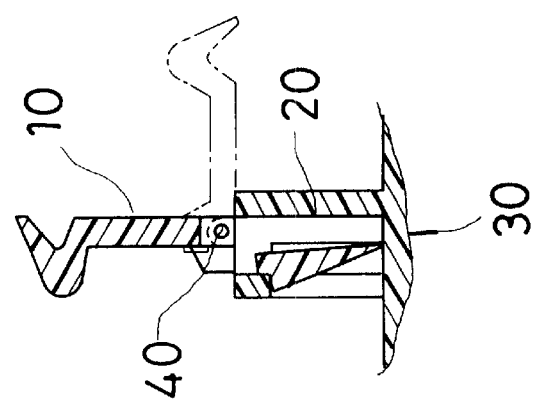
FIG. 7 is a cross-sectional view of the conventional securing member fitted to a wheel cover.

Referring to FIGS. 1, 4 and 5, a securing member 2 for a wheel cover according to the present invention includes an upper part, and a lower plate part 23.

The securing member 2 is to be movably connected to a corresponding one of spaced connecting plates 12 of a wheel cover 1 that stick up from an annular protrusion 11 (FIG. 5) formed near to an edge of an inward side of the wheel cover 1. Each of the spaced connecting plates 12 has upper hook holes 13, 13, and a lower engaging hole 14. Each of the connecting plates 12 has supporting portions (not numbered) between upper edges thereof and the upper hook holes 13. Furthermore, each of the connecting plates 12 has strengthening bars 15 at two lateral edges.

The upper part has an outward protrusion 21 at an upper end thereof, and several hooking portions 22 extending from a lower end portion thereof. The hooking portions 22 are formed in such a manner as to define holding spaces A together with the lower plate part 23 and a bottom of the upper part.

The lower plate part 23 sticks down from a lower portion of the upper part. The lower plate part 23 has an engaging protrusion 231 sticking sideways from a lower portion of an inner side thereof.

In addition, each of the hooking portions 22 is formed with a curved guiding portion 221 at a lower end thereof, and a concavely curved shape 222 to face the lower plate part 23 at al upper end portion thereof.

Figure 2:
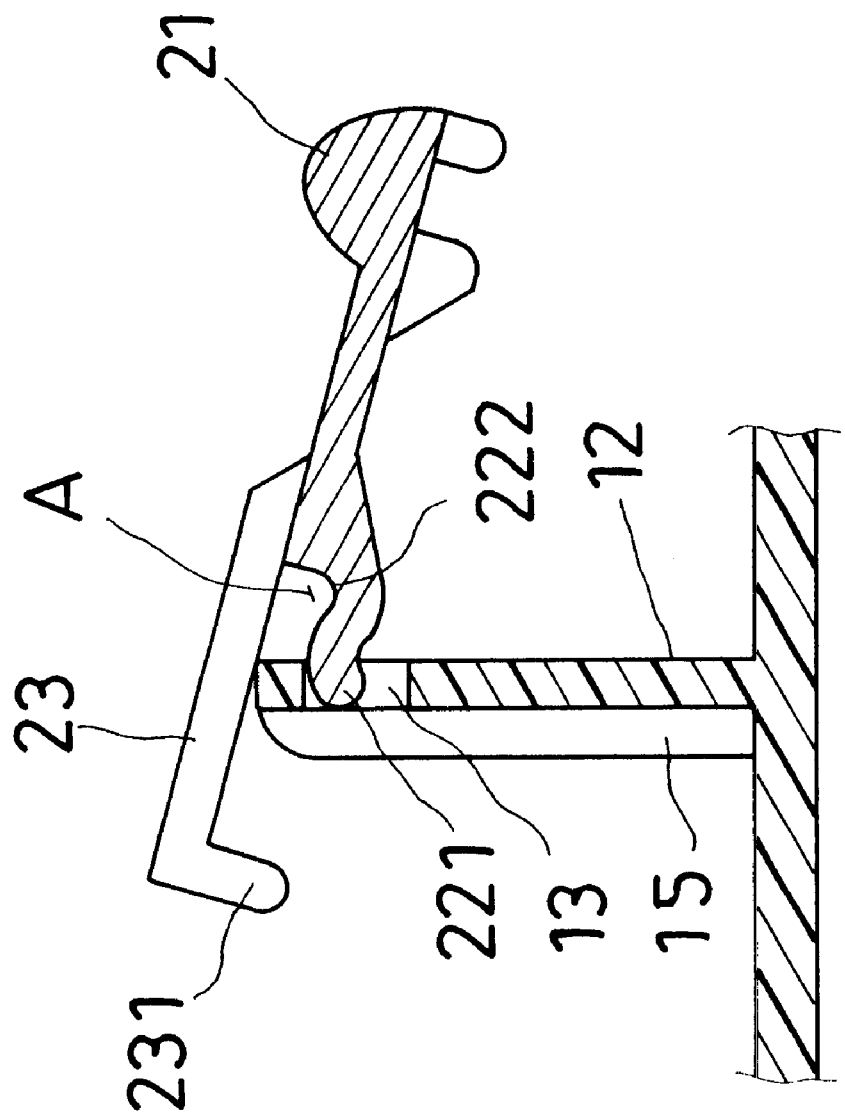
FIG. 2 is a view showing connection of the securing member of the present invention to a wheel cover.

To fit the securing member to the corresponding connecting plate 12, referring to FIG. 2, the securing member 2 is moved to a substantially tilted position, and the hooking portions 22 are passed through the upper hook boles 13; thus, the lower plate part 23 is passed over the supporting portions of the plates 12 for the same to be held in the holding spaces A. The curved guiding portions 221 help the hooking portions 22 to be passed through the upper hook holes 13. The concavely curved shape 222 of the upper end portions of the hooking portions 22 allows the securing member 2 to pivot on the connecting plate 12 easily.

Figure 3:
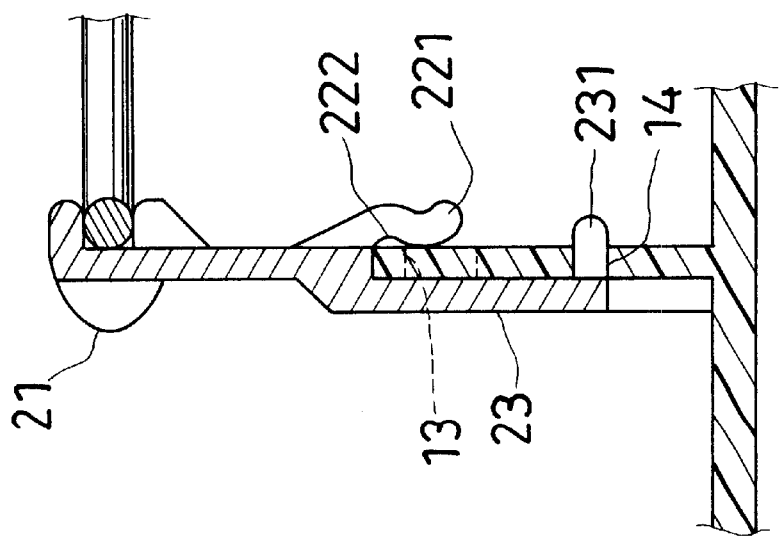
FIG. 3 is a cross-sectional view of the present securing member fitted to a wheel cover.

To secure the wheel cover 1 to a wheel, referring to FIG. 3, the securing member 2 is first pivoted on the connecting plate 12 to an in-use upright position where the engaging protrusion 231 of the lower plate part 23 is tightly inserted into the lower engaging hole 14 of the connecting plate 12, and where the bottom of the upper part is supported with the top of the connecting plate 12, and the holding spaces A hold the supporting portions of the connecting plate 12. Thus, the wheel cover 1 can be secured to a wheel by fitting the outward protrusion 21 of the securing member 2 onto a corresponding recess (not shown) of the wheel.

Referring to FIG. 4, to stack up several wheel covers of the same kind in a pile as shown in FIG. 5, the securing member 2 is moved to a not-in-use laid-down position where the engaging protrusion 231 of the lower plate part 23 is separated from the lower engaging hole 14, and where the hooking portions 22 of the upper part are inserted into corresponding upper hook holes 13 of the connecting plate 12.

From the above description, the securing member of the present invention can be known to have desirable features as followings:

1. The securing member can be pivoted to a not-in-use laid down position so that wheels covers equipped with securing members of the same kind can occupy less space when stacked up in a pile.
2. The lower plate part is made together with the upper part in formation of the securing member therefore the structure is uncomplicated, and there is no need for assembling, saving relatively much labor and time in production as compared with the conventional securing member described in the Background.

What is claimed is:

1. A securing member for a wheel cover, comprising:

an upper part having an outward protrusion at an upper end; the upper part having a plurality of hooking portions extending from a lower portion thereof;

a lower plate part extending from a lower portion of the upper part; the lower plate part having an engaging protrusion extending from a lower portion of an inner side thereof;

the securing member being movably connected to a corresponding one of spaced connecting plates of a wheel cover that extend from an edge of an inward side of the wheel cover; each of the spaced connecting plates having upper hook holes and a lower engaging hole; each of the connecting plates having supporting portions between upper edges thereof and the upper hook holes;

the hooking portions each being shaped to define a holding space against the lower plate part;

whereby the securing member can be connected to the corresponding connecting plate in an in-use position with the engaging protrusion of the lower plate part being inserted into the lower engaging hole of the connecting plate, and with the bottom of the upper part being supported by the supporting portions, and with the holding spaces receiving the supporting portions of the corresponding connecting plate;

whereby the securing member can be connected to the corresponding connecting plate in a not-in-use laid-down position with the hooking portions of the upper part being inserted into corresponding upper hook holes of the connecting plate.

2. The securing member for a wheel cover as claimed in claim 1, wherein the wheel cover is formed with an annular protrusion near to the edge of the inward side thereof, and the spaced connecting plates are formed on the annular protrusion.

3. The securing member for a wheel cover as claimed in claim 1, wherein each of the hooking portions of the upper part is formed with a curved guiding portion at a lower end.

4. The securing member for a wheel cover as claimed in claim 1, wherein each of the hooking portions of the upper part is formed with a concavely curved shape to face the lower plate part in an upper end portion thereof.

* * * * *